United States Patent
Hu et al.

(10) Patent No.: US 10,409,504 B2
(45) Date of Patent: Sep. 10, 2019

(54) SOFT-SWITCH IN STORAGE SYSTEM

(71) Applicant: EMC Corporation, Hopkinton, MA (US)

(72) Inventors: Bernie Bo Hu, Chengdu (CN); Bob Biao Yan, Chengdu (CN); Jia Huang, Chengdu (CN); Ming Yue, Chengdu (CN); Adam Yu Zhang, Luzhou (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 472 days.

(21) Appl. No.: 15/190,483

(22) Filed: Jun. 23, 2016

(65) Prior Publication Data
US 2016/0378377 A1 Dec. 29, 2016

(30) Foreign Application Priority Data

Jun. 26, 2015 (CN) .......................... 2015 1 0360058

(51) Int. Cl.
*G06F 3/06* (2006.01)

(52) U.S. Cl.
CPC ............ *G06F 3/0619* (2013.01); *G06F 3/065* (2013.01); *G06F 3/067* (2013.01); *G06F 3/0647* (2013.01)

(58) Field of Classification Search
None
See application file for complete search history.

(56) References Cited

U.S. PATENT DOCUMENTS

| | | | |
|---|---|---|---|
| 8,510,510 B1 * | 8/2013 | Patil ...................... | G06F 17/301 711/136 |
| 2005/0229031 A1 * | 10/2005 | Kojenov ............. | G06F 11/1469 714/6.22 |
| 2007/0214330 A1 * | 9/2007 | Minami .............. | G06F 11/1458 711/162 |
| 2008/0052480 A1 * | 2/2008 | Satoyama ........... | G06F 11/2069 711/162 |
| 2011/0087633 A1 | 4/2011 | Kreuder et al. | |
| 2011/0137868 A1 * | 6/2011 | Sasage ................. | G06F 3/0605 707/655 |
| 2012/0259810 A1 * | 10/2012 | Kopylovitz .......... | G06F 17/303 707/609 |

(Continued)

FOREIGN PATENT DOCUMENTS

| | | |
|---|---|---|
| CN | 101727331 A | 6/2010 |
| CN | 103814359 A | 5/2014 |
| CN | 103885811 | 6/2014 |

*Primary Examiner* — Reginald G Bragdon
*Assistant Examiner* — Michael L Westbrook
(74) *Attorney, Agent, or Firm* — BainwoodHuang

(57) ABSTRACT

Embodiments of the disclosure provide a method, a computer [program product and apparatus for a soft-switch in a storage system, by setting data in a source of the soft-switch to be read-only and starting a replication process of the data to a destination of the soft-switch in response to a soft-switch request; recording at the source an update operation for the data during the replication process and synchronously recording the update operation into the destination; updating the replicated data at the destination with the synchronously recorded update operation in response to the completion of the replication process; and disabling a data access to the source and enabling a data access to the destination.

21 Claims, 8 Drawing Sheets

(56) References Cited

U.S. PATENT DOCUMENTS

2015/0293712 A1* 10/2015 Li ........................... G06F 17/30
      711/162
2015/0370713 A1* 12/2015 Morishita ............... G06F 13/10
      711/119

* cited by examiner

SOFT-SWITCH IN STORAGE SYSTEM

RELATED INVENTION

This application claim priority from Chinese Patent Application Number CN201510360058.1, filed on Jun. 26, 2015 at the State Intellectual Property Office, China, titled "METHOD AND APPARATUS FOR SOFT-SWITCH IN STORAGE SYSTEM," the contents of which is herein incorporated by reference in entirety.

DISCLAIMER

Portions of this patent document/disclosure may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Embodiments of the present disclosure relates generally to storage systems.

BACKGROUND OF THE INVENTION

Usually, to protect against events that may disrupt data availability, it is essential for data to have a redundant copy. Typically, replication is a process in which data may be duplicated at a local or remote protection of file and block application using snapshot technology, providing an enhanced level of redundancy in case storage systems at a source fail.

SUMMARY OF THE INVENTION

Embodiments of the disclosure aim to provide a method, a computer program product and apparatus for a soft-switch in a storage system in order to handle a user's access operation to data in a source after the source is offline or set to be read-only and while a destination is not ready. The method and apparatus according to the embodiments of the disclosure may help to ensure that a soft-switch is completed without pending or interrupting a user's input/output operation on data, so as to solve the above and other problems in the prior art.

According to one embodiment of the disclosure, a method for a soft-switch in a storage system includes setting data in a source of the soft-switch to be read-only and starting a replication process of the data to a destination of the soft-switch in response to a soft-switch request; recording at the source an update operation for the data during the replication process and synchronously recording the update operation into the destination; updating the replicated data at the destination with the synchronously recorded update operation in response to the completion of the replication process; and disabling a data access to the source and enabling a data access to the destination.

BRIEF DESCRIPTION OF THE DRAWINGS

Through reading the following detailed description with reference to the drawings, the above and other purposes, features and advantages of the embodiments of the disclosure will become easy to understand. In the drawings, several embodiments of the disclosure are illustrated in an exemplary and non-limiting manner.

DETAILED DESCRIPTION

Figure 1:
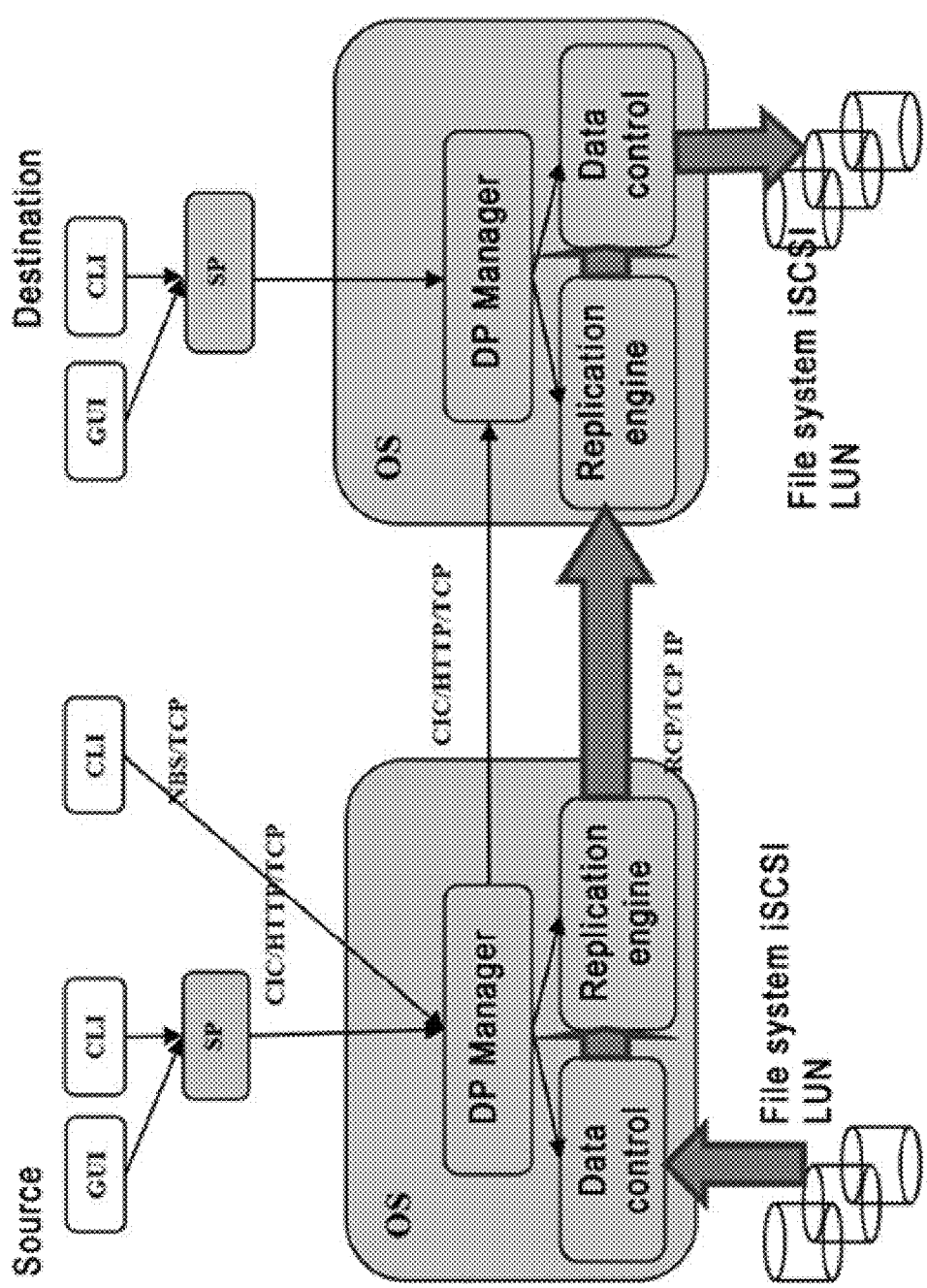
FIG. 1 schematically illustrates an exemplary diagram of an existing switching architecture from a source to a destination.

Hereinafter, various exemplary embodiments of the present disclosure will be described in detail with reference to the accompanying drawings. It should be noted that these drawings and description relate only exemplary embodiments. It should be noted that based on subsequent depiction, alternative embodiments of the structure and method disclosed here can be easily contemplated, and these alternative embodiments may be used without departing from the principle as claimed in the present disclosure. It should be understood that these specific embodiments are described only for those skilled in the art to understand and implement the disclosure in a better way, rather than limit the scope of the disclosure in any way.

The terms "comprise", "include" and the like used here should be understood as open terms, i.e., "comprise/include, but not limited to". The term "based on" means "at least partially based on". The term "one embodiment" indicates "at least one embodiment"; the term "another embodiment" indicates "at least one further embodiment". Relevant definitions of other terms will be provided in the description below.

In some embodiments, soft-switch replication may be one replication case for disaster recovery of storage resource. In some other embodiments, soft-switch (synchronous failover) may enable Logic Unit Numbers (LUNs) or a file system of a destination storage resource to be made available to hosted storage resources with no data loss. In some other embodiments, it reverses a replication session so that an original source, which is available on both management and data paths, fully participates in the process, and becomes a new destination storage resource.

In some embodiments, during the replication process, a system generally suspends input/output (I/O) operations, i.e., reading and/or writing operations of data, from start of a step of disabling a host data access to an end of a step of enabling a host data access. In some other embodiments, a system may be perceived to be responsive when a user gets quick and timely feedback from the system. In some other embodiments, user commands typically may be provided with feedback within 3 seconds, but an existing replication synchronization operation requires much more time than that. In some other embodiments for example, it may take more time when a network condition is not good, and a turnaround time on a storage array may be expected to be very short.

Embodiments of the disclosure aim to provide a method, a computer program product and apparatus for a soft-switch in a storage system in order to handle a user's access operation to data in a source after the source is offline or set to be read-only and while a destination is not ready. The method and apparatus according to embodiments of the disclosure may help to ensure that a soft-switch may be completed without pending or interrupting a user's input/output operation on data, thereby ameliorating many problems noticed with existing systems.

According to one embodiment a method for a soft-switch in a storage system may include setting data in a source of a soft-switch to be read-only and starting a replication process of a data to a destination of the soft-switch in response to a soft-switch request. A further embodiment may include recording at a source an update operation for data during a replication process and synchronously recording an update operation into a destination. A further embodiment may include updating replicated data at a destination with a synchronously recorded update operation in response to completion of a replication process. A further embodiment may include disabling data access to a source and enabling data access to a destination.

In a further embodiment, recording at a source an update operation for data during a replication process and synchronously recording an update operation into a destination may further include recording new data written during a replication process at a source and synchronously recording written new data into a destination. In a further embodiment, recording at a source an update operation for data during a replication process and synchronously recording a update operation into a destination may include creating a source cache at a source and a destination cache at a destination for recording at the source an update operation for data and written new data during a replication process and synchronously recording into a destination.

In a further embodiment, creating a source cache at a source and a destination cache at a destination for recording at the source an update operation for data and written new data during a replication process and synchronously recording into a destination may include recording an update operation for data and written new data during a replication process with a source cache and synchronously recording into a destination cache.

In a further embodiment, a source cache and a destination cache may be logically represented by data structures mirroring each other. In a further embodiment, a data structure may include a head including a cache pointer and an inode chain, and a body at least including written new data. In a further embodiment, a cache pointer may at least store an entrance address of an inode chain and the inode chain may store inodes recording an update operation.

In a further embodiment, recording at a source an update operation for data during a replication process and synchronously recording an update operation into a destination may include returning data or recorded new data from a source in response to a read operation for data or written new data.

In a further embodiment, starting a replication process of data to a destination of a soft-switch may include: determining a destination for a soft-switch according to a configuration of a replication process and configuring a storage space of a determined destination for a replication process. In a further embodiment, starting a replication process of data to a destination of a soft-switch may include selecting an internal connection between a source and a destination and establishing a session on a selected internal connection to act as a communication pipe for a replication process.

In a further embodiment, updating replicated data at a destination with a synchronously recorded update operation may include using a recorded update operation as a latest snapshot of the replicated data. In a further embodiment, disabling data access to a source and enabling data access to a destination may include disconnecting a data connection with a source and establishing a data connection with a destination.

In one embodiment, an apparatus for a soft-switch in a storage system may include a replication unit that may be configured to set data in a source of a soft-switch to be read-only and start a replication process of data to a destination of the soft-switch in response to a soft-switch request. A further embodiment may include a recording unit that may be configured to record at a source an update operation for data during a replication process and synchronously recording an update operation into the destination. A further embodiment may include an update unit that may be configured to update replicated data at a destination with a synchronously recorded update operation in response to completion of a replication process. A further embodiment may include a switching unit that may be configured to disable data access to a source and enable data access to a destination.

In one embodiment, a computer program product may include program codes, which when executed on a processor, may cause a processor to perform the method as disclosed above. In one embodiment, a storage system may include an apparatus as disclosed above.

Reference is made to FIG. 1, which schematically illustrates a diagram of existing switching architecture from a source to a destination. As shown in FIG. 1, at the source, a user may utilize a graphical interface GUI or a command line interface CLI to interact with a data processing (DP) manager in an operation system through the CIC, HTTP or TCP protocols, etc. via a storage processor SP. Alternatively, the user may also utilize the command line interface CLI to directly interact with the DP manager through the NBS or TCP protocol. At the destination, the user may utilize the GUI or CLI to interact with the data processing (DP) manager in the operation system via the storage processor SP. The DP manager may interact with a data control module and a replication engine at both the source and the destination.

In one embodiment, considering a replication process, a data control module at a source may retrieve data for which a soft-switch may be performed from a file system and iSCSI LUN and transfer it to a replication engine at the source, which may then transfer data to a destination engine through the RCP, TCP IP protocols, etc. In a further embodiment, a destination engine may further transfer data to a data control module at a destination, which may in turn store data into a storage space of the destination through a file system and iSCSI LUN. In a further embodiment, during the replication process, a data processing manager of a source may perform necessary communications with a data processing manager of a destination through the CIC, HTTP and TCP protocols, etc.

In one embodiment, a basic procedure of a soft-switch may include the following steps.

i. First, a storage administrator may select in a source, data for which a soft-switch may be performed; the system may perform a series of internal synchronizations, until a pending replication of a storage resource of the source is less than 100 MB.
  ii. Second, the system may disable a host access to data in a source; for file storage resources, the system sets data in the source to be read-only and makes a shared folder server inactive.
  iii. Third, a system may perform a final synchronization to a destination.
  iv. Fourth, a system may perform a verification procedure including verifying that a source is in a read-only state, a destination is in a read-write state such that no data may be lost.
  v. Fifth, a system may reverse a replication session.
  vi. Finally, a system may enable a host access to data in destination, i.e., for file storage resources, a system sets a storage resources to be readable and writable, and makes a shared folder server active.

In some embodiments, during a replication process, a system suspends input/output (I/O) operations on data, from a start of the step of disabling a host data access to an end of the step of enabling a host data access. In a further embodiment, a system may be perceived to be responsive when a user gets quick and timely feedback from a system. In a further embodiment, user commands may be provided with feedback within 3 seconds, but an existing replication synchronization operation may require more than that, and it may take more time when a network condition is not good, and for this purpose, turnaround time on a storage array may be expected to be very short.

Embodiments of the disclosure may handle a user's access operation on data in a source after the source is offline or set to be read-only and while a destination is not ready, which helps to ensure that a soft-switch may be completed without pending or interrupting input/output operations on data.

Figure 2:
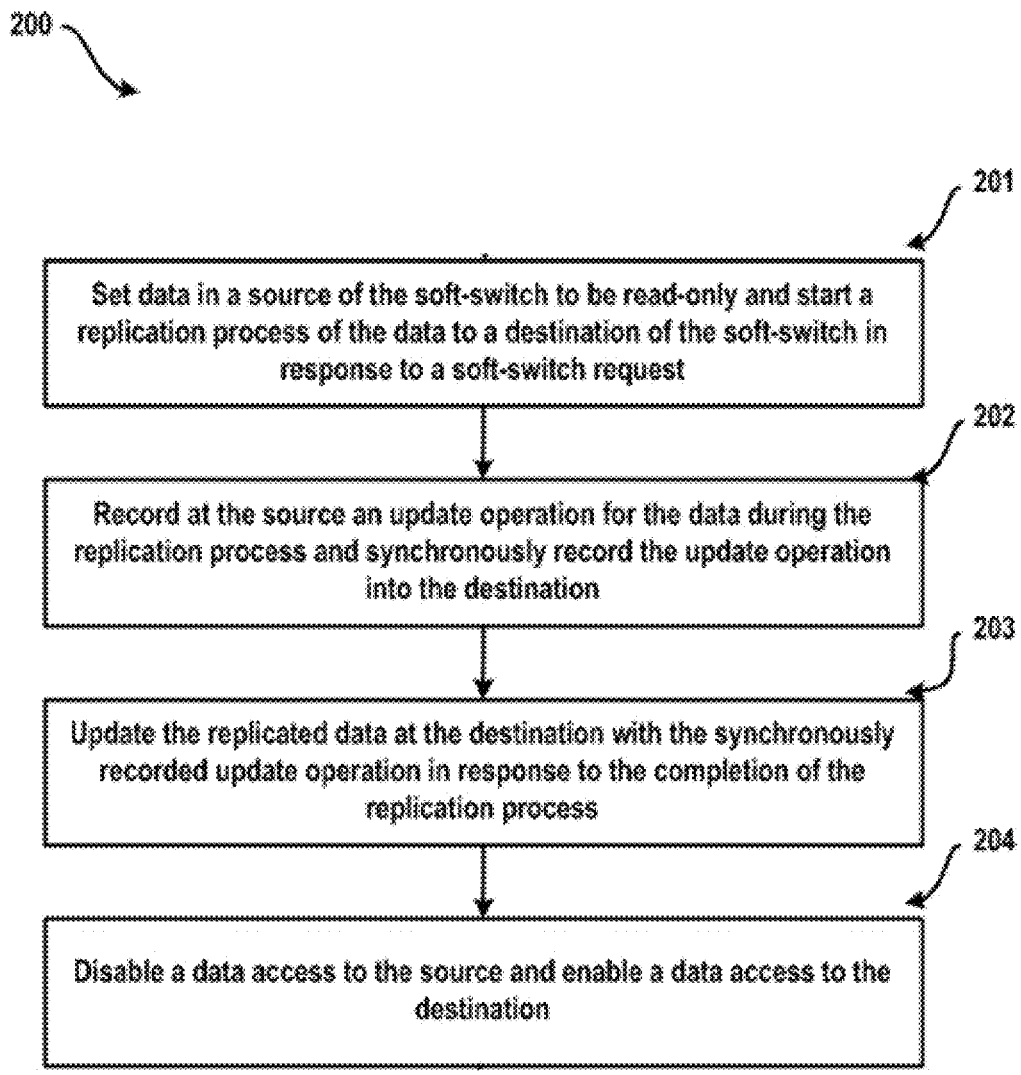
FIG. 2 schematically illustrates a method for a soft-switch in a storage system according to an exemplary embodiment of the disclosure.

FIG. 2 schematically illustrates a method 200 for a soft-switch in a storage system according to an exemplary embodiment of the disclosure. As shown in FIG. 2, in step 201, in response to a soft-switch request, data in a source for the soft-switch is set to be read-only and a replication process of the data to a destination for the soft-switch is started. In step 202, an update operation for the data is recorded at the source during the replication process and the update operation is synchronously recoded into the destination. After the data in the source is set to be read-only and prior to the replication process is completed, the system may still receive from the user an update operation for the data which is set to be read-only, such as modifications on the data, etc. In step 203, the replicated data is updated at the destination with the synchronously recorded update operations in response to the completion of the replication process. Next, at step 204, in which a data access to the source is disabled and a data access to the destination is enabled In one embodiment, those skilled in the art may understand that a soft-switch may be initiated by various related entities for various reasons, such as due to a periodical redundancy backup and a temporary triggering of a storage administrator, etc., and embodiments of this disclosure is not limiting in this regard. In a further embodiment, any soft-switch in a storage system may apply method 200 provided by embodiments of the disclosure.

In one embodiment, those skilled in the art may also understand that, during the process of step 201, especially prior to starting a replication process of data to a destination for a soft-switch, a system may be required to also perform replication preparation works related to the soft-switch, such as internal synchronizations, acquiring parameters of the replication process and state verifications, etc. In a further embodiment, since these processes may be well known to those skilled in the art, the disclosure will no longer repeat them.

In one embodiment, method 200 may also include: determining a destination for a soft-switch according to a configuration of a replication process and configuring a storage space of a determined destination for the replication process. In a further embodiment, in a storage system, there may be multiple available candidate destinations when a soft-switch is going to be performed. In a further embodiment, therefore, method 200 may finally determine a destination to perform a soft-switch according to related configurations of a replication process.

In one embodiment, method 200 may also include: selecting an internal connection between a source and a destination and establishing a session on a selected internal connection to act as a communication pipe for a replication process. In a further embodiment, in a storage system, there may be multiple available candidate internal connections between a source and a destination after a destination for performing a soft-switch may be determined. In a further embodiment, therefore, method 200 may select one or more internal connections from these available candidate internal connections for performing a soft-switch. In a further embodiment, method 200 may establish a session on a selected internal connection to act as a communication pipe for a replication process and/or other data synchronizations.

According to one embodiment, with reference to step 202, in order to be able to embody an update operation in a data replicated to a destination, method 200 records an update operation at a source and synchronously records into a destination, so as to update replicated data according to an update operation after the replication process is completed. In a further embodiment, In a further embodiment, a user's update operation on data may not be interrupted during a replication process such that it may not be influenced by a soft-switch, thereby improving a user's experience compared to the existing method.

In one embodiment, method 200 may also include recording at a source new data written during a replication process and synchronously recording the written new data into a destination. In a further embodiment, an update operation on original data which has been set to be read-only for a source may be recorded in method 200. In an addition embodiment, method 200 may also record new data written by a user during a replication process and synchronously record the written new data into a destination. In a further embodiment, new data written by a user during a replication process may also be embodied in a destination after a soft-switch is completed. In a further embodiment, during a replication process, from a user's perspective, a user may not only perform update operations on original data but also may write new data, thereby further improving a user's experience.

In one embodiment, method 200 may further include creating a source cache at a source and a destination cache at a destination, for recording at a source an update operation for data and written new data during a replication process and synchronously recording into the destination. According to one embodiment, a recording task of the above update operation and written new data at a source may be done with a source cache, while synchronously recording task of the above update operation and written new data at a destination may be done with a destination cache. In a further embodiment, prior to performing the above recording and synchronously recording tasks, method 200 creates a source cache and a destination cache respectively at a source and a destination, for recording at a source an update operation for original data and written new data during a replication process and synchronously recording into a destination.

In one embodiment, a source cache and a destination cache may logically be represented by data structures mirroring each other. In one embodiment, a data structure may include a head and a body. In a further embodiment, a head may include a cache pointer and an inode chain. In a further embodiment, a body may at least include written new data. In one embodiment, a cache pointer may at least store an entrance address of an inode chain and an inode chain may store inodes for recording update operations. Further reference will be made to step of method 200 later in the description.

Figure 3:
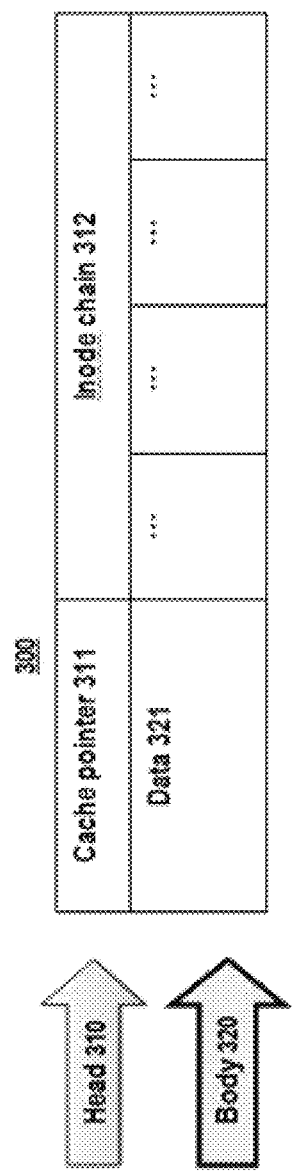
FIG. 3 schematically illustrates an exemplary data structure for a source cache and a destination cache according to an exemplary embodiment of the disclosure.

Reference is now made to FIG. 3, which schematically illustrates an exemplary data structure 300 for a source cache and a destination cache according to one embodiment of the disclosure. As described above, a source cache and a destination cache may be a kind of data storage area at a source and a destination as mirrors, which may be logically represented by data structure 300. They may be used for recording continuous input/output I/O operations of data at the source and synchronously mirrors any updates to the remote destination.

As shown in FIG. 3, exemplary data structure 300 may include a head 310 and a body 320. Head 310 may include a cache pointer 311 and an inode chain 312. Body 320 may include data (that may include written new data) updated at the source based on ROFW (Redirect on First Write) technology and necessary data structures. Inode chain 312 may store a series of inodes, which may redirect pointers for an update between a source cache and a original data based on ROFW technology. Inode chain 312 may use a same logic as advanced snapshot function.

The cache pointer 311 may store an entrance address of inode chain 312 for updated data blocks and may further include a pointer to data in the source. In one embodiment, except system-reserved cells, cache pointer 311 may start from the first available cell of each source cache or destination cache. The specific size of cache pointer 311 may be determined from the specific storage environment and actual demands. Specifically, cache pointer 311 may be made of $2^N$ cells. The cell is a minimum unit for a system to access a source cache or destination cache, i.e., a block space in a block device or a page space in a file device. In an example embodiment, if a minimum unit for accessing file device by Linux is 4 KB (i.e., one page), then size of a cell is 4 KB, and the size of a cache pointer 311=$2^N$ cells (N=0, 1, 2, . . . , and N depends on the requirements of the implementation). In a further embodiment, however, a cell in a block device refers to one block and one page in a file device.

Referring back to FIG. 2, in one embodiment, method 200 may further include returning data or recorded new data from a source in response to a read operation for the data or the recorded new data. In one embodiment, specifically, during a replication process, a user may also need to perform a read operation on original data being replicated and new data written during a replication process. In a further embodiment, since original data may be still readable during a replication process and new data written by a user may be recorded, method 200 may return data to be read by a user according to a corresponding read operation. In a further embodiment, during a replication process, a user may not only perform an update operation of original data and write new data, but also implement a read operation on original data and written new data.

Continue to refer to FIG. 2. Method 200 may proceed to step 203 after step 202. In step 203, replicated data is updated at a destination with synchronously recorded update operations in response to completion of a replication process. In some embodiment, after completion of a replication process, since a user may perform update operations on replicated data during the replication process, method 200 may update replicated data with synchronously recorded update operations at a destination in order to embody update operations in the replicated data at a destination. In a further embodiment, a user may seamlessly perform subsequent read-write operations on data based on previous update operations after a soft-switch is performed.

In one embodiment, method 200 may further include using recorded update operation as a latest snapshot of replicated data. In a further embodiment, update operations may be based on snapshot technology. Method 200 may record update operations by snapshot technology, such that recorded update operations is the latest snapshot of replicated data after completion of a replication process. In a further embodiment, at a destination, method 200 may associate synchronously recorded latest snapshot of replicated data with the replicated data, i.e., realizing update operations on the replicated data.

Next, method 200 may proceed to step 204, in which a data access to a source is disabled and a data access to a destination is enabled. In one embodiment, method 200 may further include disconnecting a data connection with a source and establishing a data connection with a destination, so as to realize disabling data access to a source and enabling data access to a destination. Method 200 completes after step 204.

Figure 4:
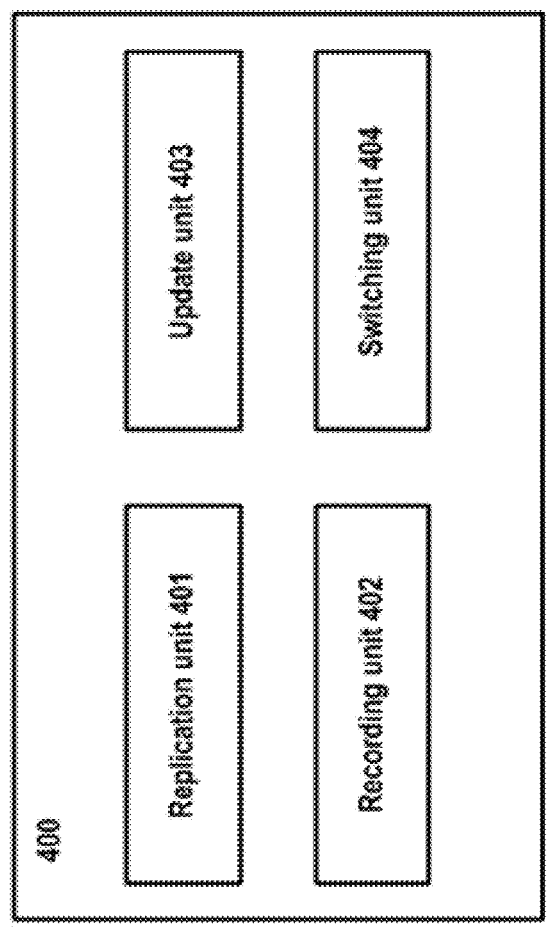
FIG. 4 schematically illustrates an apparatus for a soft-switch in a storage system according to an exemplary embodiment of the disclosure.

Reference is now made to FIG. 4, which schematically illustrates apparatus 400 for a soft-switch in a storage system according to an exemplary embodiment of the disclosure. As illustrated in FIG. 4, apparatus 400 may include replication unit 401, recording unit 402, update unit 403 and switching unit 404. According to embodiments of the disclosure, replication unit 401 may be configured to set data in a source of a soft-switch to be read-only and start a replication process of data to a destination of a soft-switch in response to a soft-switch request. Recording unit 402 may be configured to record at a source an update operation for data during a replication process and synchronously record an update operation into the destination. Update unit 403 may be configured to update replicated data at the destination with the synchronously recorded update operation in response to the completion of the replication process. Switching unit 404 may be configured to disable a data access to the source and enable a data access to the destination.

In one embodiment, recording unit 402 may be further configured to record at a source new data written during a replication process and synchronously record written new data into a destination. In one embodiment, recording unit 402 may be further configured to create a source cache at a source and a destination cache at a destination, for recording at a source an update operation for data and written new data during a replication process and synchronously recording to a destination. In one embodiment, a recording unit 402 may be further configured to record an update operation for data and written new data during a replication process with a source cache and synchronously record into a destination cache.

In one embodiment, a source cache and a destination cache may be logically represented by data structures mirroring each other. In one embodiment, a data structure may include a head including a cache pointer and an inode chain, and a body may at least include written new data. In one embodiment, a cache pointer may at least store an entrance address of an inode chain and an inode chain stores inodes recording an update operation. In one embodiment, recording unit 402 may be further configured to return data or recorded new data from a source in response to a read operation for data or written new data. In one embodiment, replication unit 401 may be further configured to determine a destination for a soft-switch according to a configuration of a replication process and configure a storage space of a determined destination for the replication process. In one embodiment, replication unit 401 may be further configured to select an internal connection between a source and a destination and establishing a session on a selected internal connection to act as a communication pipe for a replication process. In one embodiment, update unit 403 may be further configured to use a recorded update operation as a latest snapshot of replicated data. In one embodiment, switching unit 404 may be further configured to disconnect a data connection with a source and establish a data connection with a destination.

In the following, with reference to FIGS. 5-7, a specific implementation of the disclosure is described in an only exemplary manner. Those skilled in the art should understand that the disclosure is not limited to the details in the specific implementation, but rather may be implemented with details different from the specific implementation.

Figure 5:
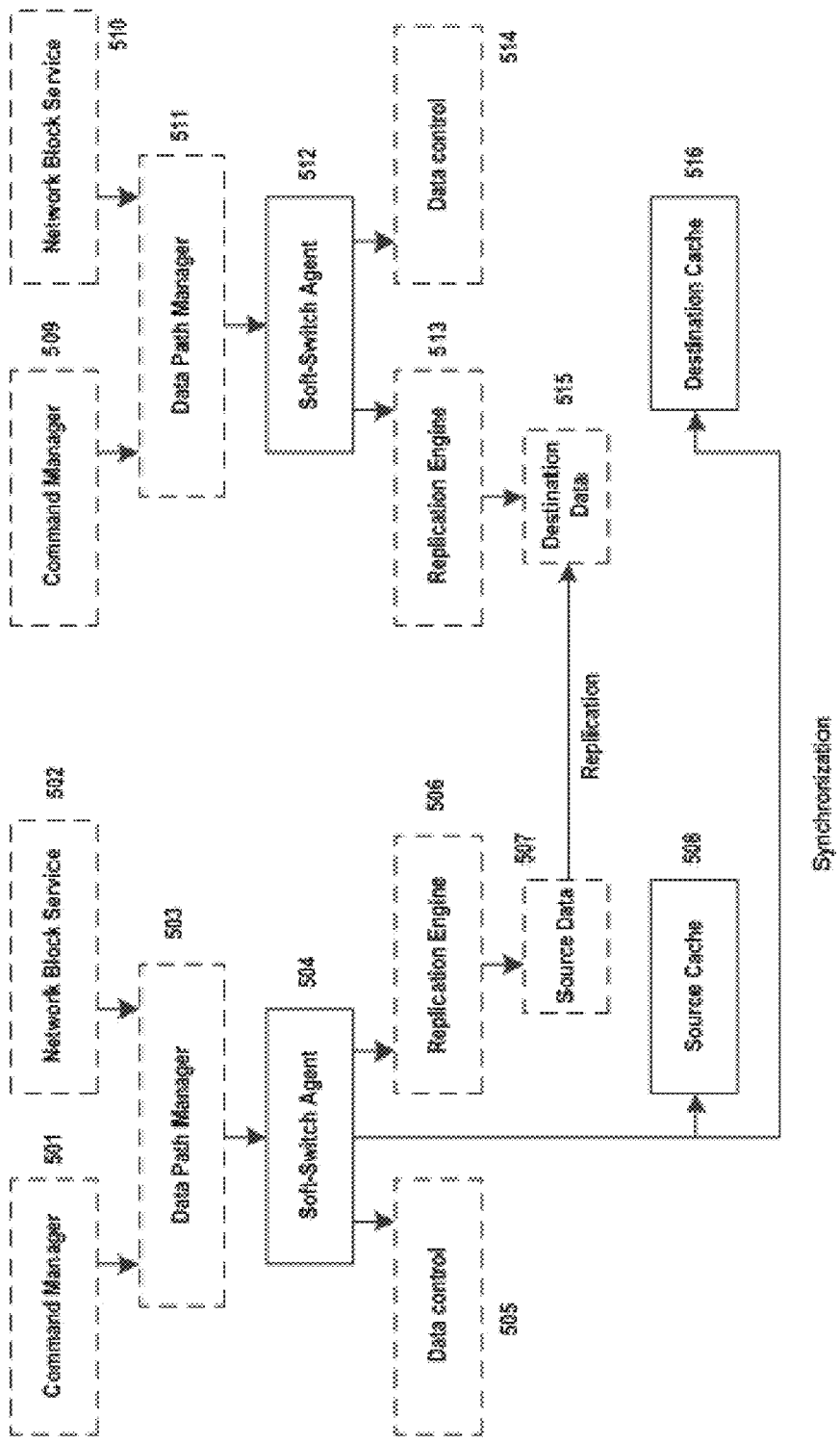
FIG. 5 schematically illustrates a topological structure of a soft-switch according to an exemplary embodiment of the disclosure.

FIG. 5 schematically illustrates topological structure 500 of a soft-switch according to an exemplary embodiment of the disclosure. In exemplary topological structure 500 of the soft-switch shown in FIG. 5, soft-switch agent modules 504 and 512 according to one embodiment of the disclosure may be formed at the source and the destination respectively, for implementing the method for a soft-switch in a storage system according to the disclosure. In exemplary topological structure 500 illustrated in FIG. 5, soft-switch agent module 504 of the source may be placed between data path manager 503 of the source and replication engine 506 of the source. Correspondingly, soft-switch agent module 512 of the destination may be placed between data path manager 511 of the destination and replication engine 514 of the destination. The existing modules in the system are represented with the dotted box while the newly added modules according to embodiments of the disclosure, i.e., soft-switch agent module 504 of the source, soft-switch agent module 512 of the destination, cache module 508 of the source and cache module 516 of the destination, are represented with the solid box. The interactions between the modules may be represented with arrows in FIG. 5. The existing interaction steps in a soft-switch process are well known for those skilled in the art, so such interaction steps will no longer be repeated here.

According to one embodiment, when a soft-switch is invoked, source soft-switch agent 504 may firstly receive the user's input/output (I/O) operations on data in the source. Then source cache 508 and destination cache 516 may be created for a continuous synchronous write as to the data in the source. Subsequently, these two caches 508 and 516 may receive synchronous input/output (I/O) operations on the data in the source from soft-switch agent module 504 of the source, until the replication is completed and a service of the destination gets ready. Finally, the module for updating the replicated data in soft-switch agent module 512 of the destination may use destination cache 516 as the latest snapshot of the data in the destination before a data path to the destination is established.

Figure 6:
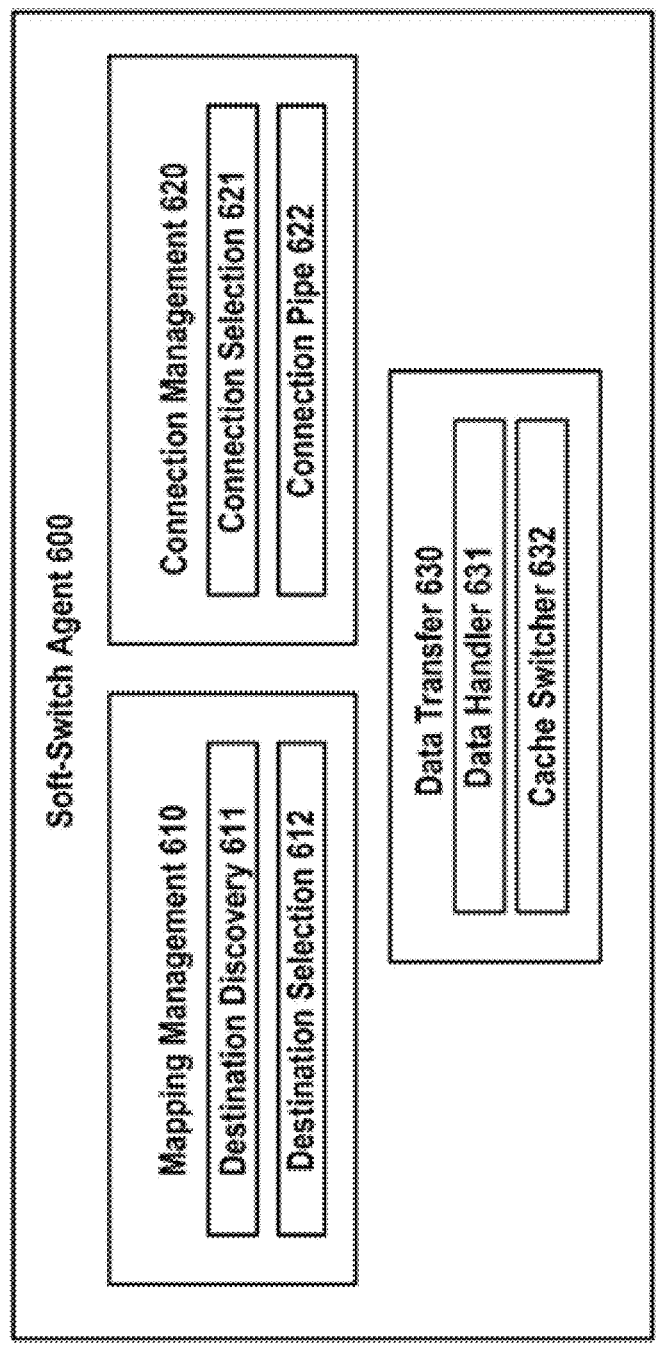
FIG. 6 schematically illustrates an exemplary structure diagram of a soft-switch agent module according to an exemplary embodiment of the disclosure.

FIG. 6 schematically illustrates an exemplary structure diagram of a soft-switch agent module 600 according to an exemplary embodiment of the disclosure. As shown in FIG. 6, soft-switch agent module 600 may include mapping management module 610, connection management module 620 and data transfer module 630. Mapping management module 610 may hold mapping information between a source and a destination, and search for a destination and establish a mapping relationship between a source and the destination before a data transfer. As shown in FIG. 6, mapping management module 610 may include destination discovery module 611 and destination selection module 612. Destination management module 611 may be used to discover and determine a destination according to a current replication process configuration. Destination selection module 612 may configure a storage space of the destination after the destination is determined.

Connection management module 620 may be used to establish an internal connection between a source and a destination. As shown in FIG. 6, connection management module 620 may include connection selection module 621 and connection pipe module 622. Connection selection module 621 may be used to select an internal connection between a source and a destination and perform preparing works for establishing a session between them. Connection pipe module 622 may be used to establish a connection session between a source and a destination. In one embodiment, a connection session is a communication pipe between a source and a destination, and a communication pipe may be used for service transfer and data synchronization.

Data transfer module 630 may be used to transfer data to the source cache and the destination cache synchronously. As shown in FIG. 6, data transfer module 630 may include data handler 631 and cache switcher 632. Data hander 631 may be used to handle requested input/output (I/O) operations and return data from the source or the destination according to a state of the replication session. Cache switcher 632 may be used to switch the destination cache to serve as the latest snapshot of destination resources.

Figure 7:
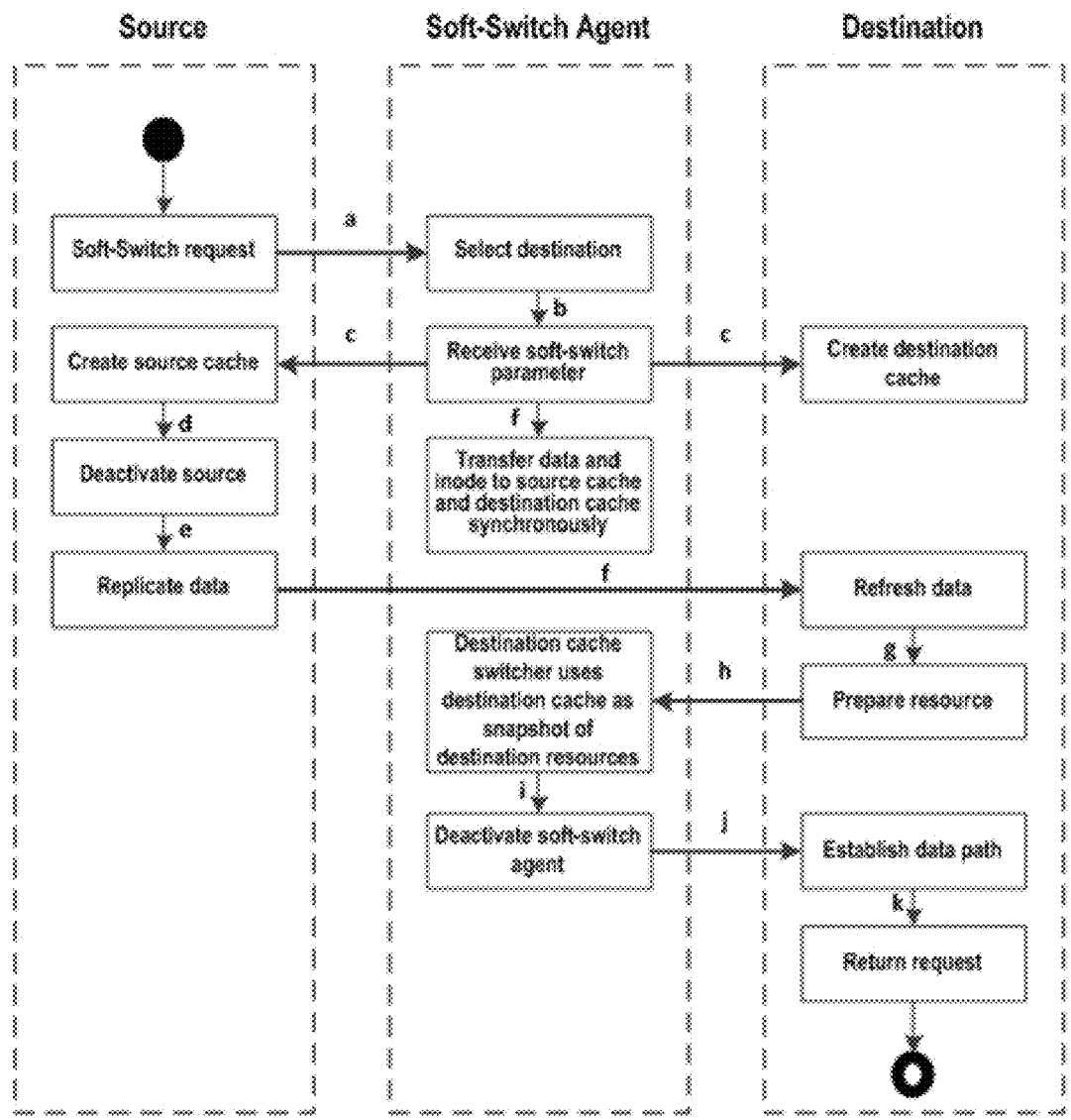
FIG. 7 schematically illustrates an exemplary process of a soft-switch according to an exemplary embodiment of the disclosure.

FIG. 7 schematically illustrates an exemplary process 700 of a soft-switch according to one embodiment of the disclosure. It should note that process 700 is only an exemplary process of one embodiment of the disclosure. Those skilled in the art may implement the method according to the embodiments of the disclosure with other suitable manners other than process 700, according to the specific technical environment and technical requirements.

As shown in FIG. 7, process 700 includes steps a-k. In step a, a soft-switch agent module may select a destination for a replication process. In step b, the soft-switch agent may receive a soft-switch request from a source including parameters or the like related to the soft-switch to be performed. In step c, the soft-switch agent module may create a source cache and a destination cache at the source and the destination respectively, for a continuous synchronous write as to the source. In step d, the source may set data (including a file system or LUNs) to be read-only and detach the data access to host. In step e, if needed, the source performs necessary data synchronization operations prior to the start of the replication process. In step f, the system may perform the replication process to the destination; meanwhile, the source cache and the destination cache receive synchronized inodes that record update operations and data I/O operations from the soft-switch agent, until the replication is completed and the service of the destination gets ready. In step g, the system may prepare the latest data from the replicated data at the destination and the destination cache. In step h, the destination cache switcher may use the destination cache as the latest snapshot of the data in the destination. In step i, the soft-switch agent may be deactivated. In step j, the destination may establish a data path. In step k, the destination may return the soft-switch request.

Figure 8:
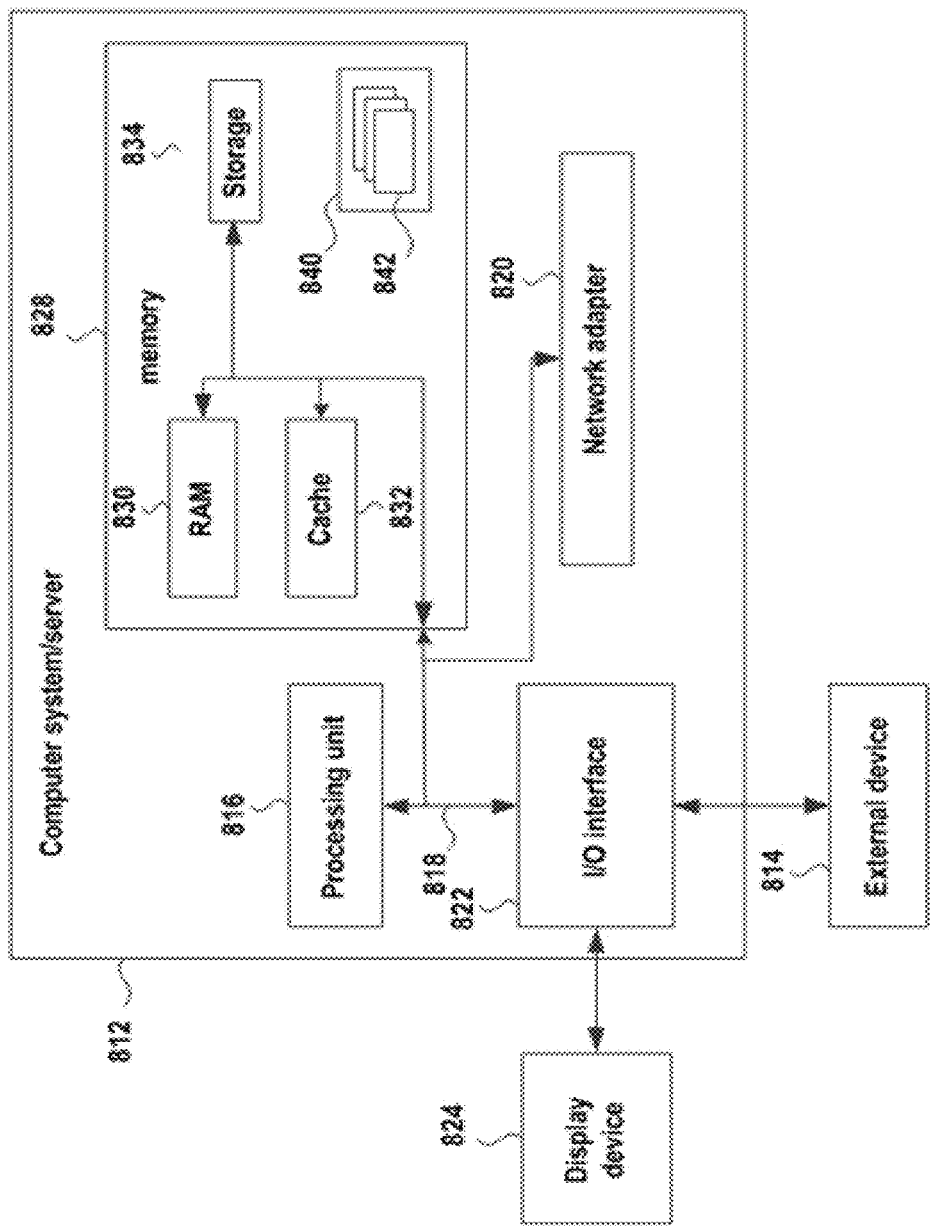
FIG. 8 schematically illustrates a block diagram of an exemplary computer system/server diagram which may be used to implement the embodiments of the disclosure.

FIG. 8 schematically illustrates a block diagram of an exemplary computer system/server 812 which may be used to implement the embodiments of the disclosure. It should note that computer system/server 812 shown in FIG. 8 is only an example, which does not limit the function and application range of the embodiments of the disclosure. As shown in FIG. 8, computer system/server 812 is represented in a form of a general-purpose computing device. The components of computer system/server 812 include, but not limited to: one or more processors or processing units 816, system memory 828, bus 818 for connecting different system components (including the system memory 828 and the processing unit 816).

Bus 818 represents one or more of several bus structures, which include memory bus or memory controller, peripheral bus, accelerated graphics port, processor or local bus using any of the multiple bus structures. For example, these architectures comprises but not limited to Industry Standard Architecture (ISA) bus, Micro Channel Architecture (MCA) bus, enhanced ISA bus, Video Electronics Standards Association (VESA) local bus and Peripheral Component Interconnect (PCI) bus.

Computer system/server 812 typically comprises multiple computer system readable medium, which are any available medium that may be accessed by computer system/server 812, including volatile and non-volatile medium as well as removable and non-removable medium.

System memory 828 may include computer system readable medium in the form of volatile memory, such as memory 830 and/or cache 832. Computer system/server 812 may further include other removable/non-removable and volatile/non-volatile computer system storage medium. Although FIG. 8 does not illustrate, it may provide a disk drive for reading and writing the removable non-volatile disk (e.g., floppy disk) and a CD-ROM drive for reading and writing the removable volatile compact disk (e.g., CD-ROM, DVD-ROM or other optical medium). In such case, each drive may connect with bus 818 through one or more data medium interfaces. Memory 828 may comprise at least one program product having a group of (e.g., at least one) program modules, the program modules being configured to perform the functions of each embodiment of the disclosure.

Program/utility tool 840 including at least one program module 842 may be stored for example, in memory 828. Such program module 842 includes but not limited to: an operation system, one or more applications, other program modules and program data. Each one or a certain combination of these examples may comprise the implementation of network environment. Program module 842 usually performs the function and/or method in the embodiments described in the disclosure.

As required, computer system/server 812 may also communicate with one or more external devices (e.g., display device 824, storage device 814, etc.), and communicate with one or more devices that allow the user to interact with computer system/server 812, and/or communicate with any devices (e.g., network card and modem, etc.) that allow computer system/server 812 to communicate with one or more other computing devices. The communication may perform through input/output (I/O) interface 822. Besides, computer system/server 812 may communicate with one or more networks (e.g., Local Area Network (LAN), Wide Area Network (WAN) and/or public network, such as Internet) via network adapter 820. As shown in the figure, network adapter 820 communicates with other modules of computer system/server 812 via bus 818. It should be understood that although the figure does not illustrate, it may be possible to use other hardware and/or software modules in combination with computer system/server 812, the other hardware and/or software modules comprising but not limited to: microcode, device driver, redundancy processing unit, and external disk drive array, RAID system, tape drive and data backup storage system, etc.

It should note that embodiments of the present invention may be implemented by hardware, software or the combination of hardware and software. The hardware part may be implemented by special logic while the software part may be stored in the memory and executed by an appropriate instruction execution system, such as a microprocessor or special-designed hardware. Those of ordinary skilled in the art may understand the above device and method may be implemented by means of computer executable instructions or within the processor control code. In implementation, the programmable memory or data carrier, such as optical or electronic signal carrier may provide such code thereon.

Furthermore, although the drawings describe the operation of the method of the disclosure in a specific sequence, it does not necessarily require or suggest that the operation must be executed in the specific sequence or all shown operations must be executed to realize the expected result. On the contrary, the order of the steps depicted in the flow chart may be altered. Additionally or alternatively, some steps may be omitted or multiple steps may be combined into one step for execution, and/or one step is disintegrated into multiple steps for execution. It should also note that the features and functions of two or more apparatuses in the disclosure may be materialized in one apparatus. Conversely, the feature and function of one apparatus described above may be materialized by multiple apparatuses.

Although the disclosure is described with reference to multiple specific embodiments, it should be understood that the present disclosure is not limited to the embodiments disclosed herein. The present disclosure aims to encompass all kinds of modifications and equivalent arrangements included within the spirit and scope of the appended claims.

What is claimed is:

1. A method for a soft-switch in a storage system, the method comprising:

setting data in a source of the soft-switch to be read-only and starting a replication process of the data to a destination of the soft-switch in response to a soft-switch request;

recording at the source an update operation for the data during the replication process and synchronously recording the update operation into the destination without updating replicated data at the destination with the update operation as long as the replication process continues;

updating replicated data at the destination with the update operation in response to completion of the replication process; and disabling a data access to the source and enabling a data access to the destination by disconnecting a data connection with the source and establishing a data connection with the destination.

2. The method of claim 1, wherein recording at the source an update operation for the data during the replication process and synchronously recording the update operation into the destination further comprises:
recording new data written during the replication process at the source and synchronously recording the written new data into the destination.

3. The method of claim 2, further comprises:
creating a source cache at the source and a destination cache at the destination for recording at the source the update operation for the data and the written new data during the replication process and synchronously recording into the destination.

4. The method of claim 3, wherein creating a source cache at the source and a destination cache at the destination for recording at the source the update operation for the data and the written new data during the replication process and synchronously recording into the destination comprises:
recording the update operation for the data and the written new data during the replication process with the source cache and synchronously recording into the destination cache.

5. The method of claim 3, wherein the source cache and the destination cache are logically represented by data structures mirroring each other, and the data structure comprises a head including a cache pointer and an inode chain, and a body at least including the written new data.

6. The method of claim 5, wherein the cache pointer at least stores an entrance address of the inode chain and the inode chain stores inodes recording the update operation.

7. The method of claim 2, further comprises:
returning the data or recorded new data from the source in response to a read operation for the data or the written new data.

8. The method of claim 1, wherein starting a replication process of the data to a destination of the soft-switch comprises:
determining the destination for the soft-switch according to a configuration of the replication process and configuring a storage space of the destination for the replication process.

9. The method of claim 1, wherein starting a replication process of the data to a destination of the soft-switch comprises:
selecting an internal connection between the source and the destination, and
establishing a session on the selected internal connection to act as a communication pipe for the replication process.

10. The method of claim 1, wherein updating replicated data at the destination with the update operation comprises:
using a recorded update operation as a latest snapshot of the replicated data.

11. The method of claim 1, wherein disabling the data access to the source and enabling the data access to the destination are performed in response to updating the replicated data at the destination.

12. An apparatus for a soft-switch in a storage system, the apparatus configured for:
setting data in a source of the soft-switch to be read-only and starting a replication process of the data to a destination of the soft-switch in response to a soft-switch request;
recording at the source an update operation for the data during the replication process and synchronously recording the update operation into the destination without updating replicated data at the destination with the update operation as long as the replication process continues;
updating replicated data at the destination with the update operation in response to completion of the replication process; and
disabling a data access to the source and enabling a data access to the destination by disconnecting a data connection with the source and establishing a data connection with the destination.

13. The apparatus of claim 12, wherein recording at the source an update operation for the data during the replication process and synchronously recording the update operation into the destination further configured for:
recording new data written during the replication process at the source and synchronously recording the written new data into the destination.

14. The apparatus of claim 13, further configured for:
creating a source cache at the source and a destination cache at the destination for recording at the source the update operation for the data and the written new data during the replication process and synchronously recording into the destination.

15. The apparatus of claim 14, wherein creating a source cache at the source and a destination cache at the destination for recording at the source the update operation for the data and the written new data during the replication process and synchronously recording into the destination configured for:
recording the update operation for the data and the written new data during the replication process with the source cache and synchronously recording into the destination cache.

16. The apparatus of claim 14, wherein the source cache and the destination cache are logically represented by data structures mirroring each other, and the data structure comprises a head including a cache pointer and an inode chain, and a body at least including the written new data, wherein the cache pointer at least stores an entrance address of the inode chain and the inode chain stores inodes recording the update operation.

17. The method of claim 13, further configured for:
returning the data or recorded new data from the source in response to a read operation for the data or the written new data.

18. The apparatus of claim 12, wherein starting a replication process of the data to a destination of the soft-switch configured for:
determining the destination for the soft-switch according to a configuration of the replication process and configuring a storage space of the destination for the replication process.

19. The apparatus of claim 12, wherein starting a replication process of the data to a destination of the soft-switch configured for:
selecting an internal connection between the source and the destination, and
establishing a session on the selected internal connection to act as a communication pipe for the replication process.

20. The apparatus of claim 12, wherein updating replicated data at the destination with the update operation comprises:
using a recorded update operation as a latest snapshot of the replicated data.

21. A computer program product comprising: a non-transitory computer readable medium encoded with computer executable program code, wherein the code enables execution across one or more processors for setting data in a source of the soft-switch to be read-only and starting a replication process of the data to a destination of the soft-switch in response to a soft-switch request;

recording at the source an update operation for the data during the replication process and synchronously recording the update operation into the destination without updating replicated data at the destination with the update operation as long as the replication process continues;

updating replicated data at the destination with the update operation in response to completion of the replication process; and disabling a data access to the source and enabling a data access to the destination by disconnecting a data connection with the source and establishing a data connection with the destination.

* * * * *